Nov. 24, 1964   W. L. SHICK   3,157,951
DEVICE FOR ORTHOGRAPHIC-ISOMETRIC PROJECTION
Filed May 29, 1959   3 Sheets-Sheet 1

INVENTOR.
Wayne L. Shick
BY
Merriam, Lorch & Smith
ATTORNEYS

Nov. 24, 1964   W. L. SHICK   3,157,951
DEVICE FOR ORTHOGRAPHIC-ISOMETRIC PROJECTION
Filed May 29, 1959   3 Sheets-Sheet 2

INVENTOR.
Wayne L. Shick
BY
Merriam, Lorch & Smith
ATTORNEYS 3,157,951
**DEVICE FOR ORTHOGRAPHIC-ISOMETRIC
PROJECTION**
Wayne L. Shick, 1204 W. Charles St., Champaign, Ill.
Filed May 29, 1959, Ser. No. 816,964
4 Claims. (Cl. 33—77)

This invention relates to a mechanical drawing aid. It is especially concerned with drafting apparatus for use with a system of projection between the orthographic views of an object and an isometric view.

In the visualization of pictorial presentations of objects three dimensions forms can be more easily and properly interpreted than the illusory, undependable image formed by the visual and mental correlation of the three principal orthographic projections, viz, top, front, and side. Accordingly, draftsmen, illustrators, designers, and others engaged in the preparation of pictorial presentations use isometric drawings for drawings for production and manufacture, parts catalogs, repair manuals, instruction books, technical manuals, and the like. The combined orthographic-isometric projection system of this invention provides a drawing which can be easily made and interpreted because the pictorial view is three dimensional, visual, and precisely correlated with the orthographic views which show the true shapes and dimensions.

Generally in the presentation of isometric drawings the illustrator spends considerable time in studying the orthographic views of an object as well as the object itself, if it is available, to prepare properly isometric drawings of the object. Various instruments are available for facilitating the preparation of isometric drawings. In systems employing mechanical aids of this kind, the operation is not based upon any projection type of drawing system. In accordance with this invention there is provided a drafting process which employs a simple mechanical system for use in a simplified projection of an isometric view from orthographic projections and for use in direct projection of orthographic views.

In the drawings, FIGURE 1 illustrates a quadrangle and cooperating triangle frame employed as components of a preferred embodiment of the orthographic-isometric projection device of this invention.

Figure 4:
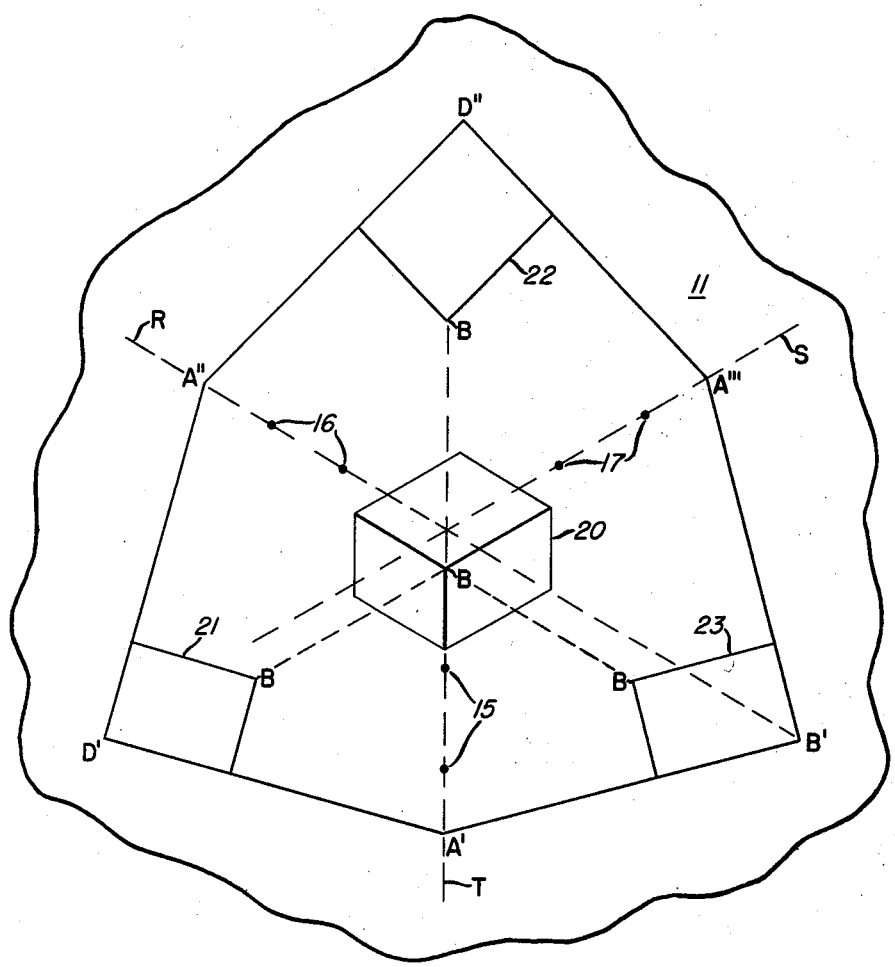

FIGURE 4 demonstrates a basic orthographic-isometric projection developed employing the device of this invention.

Figure 1:
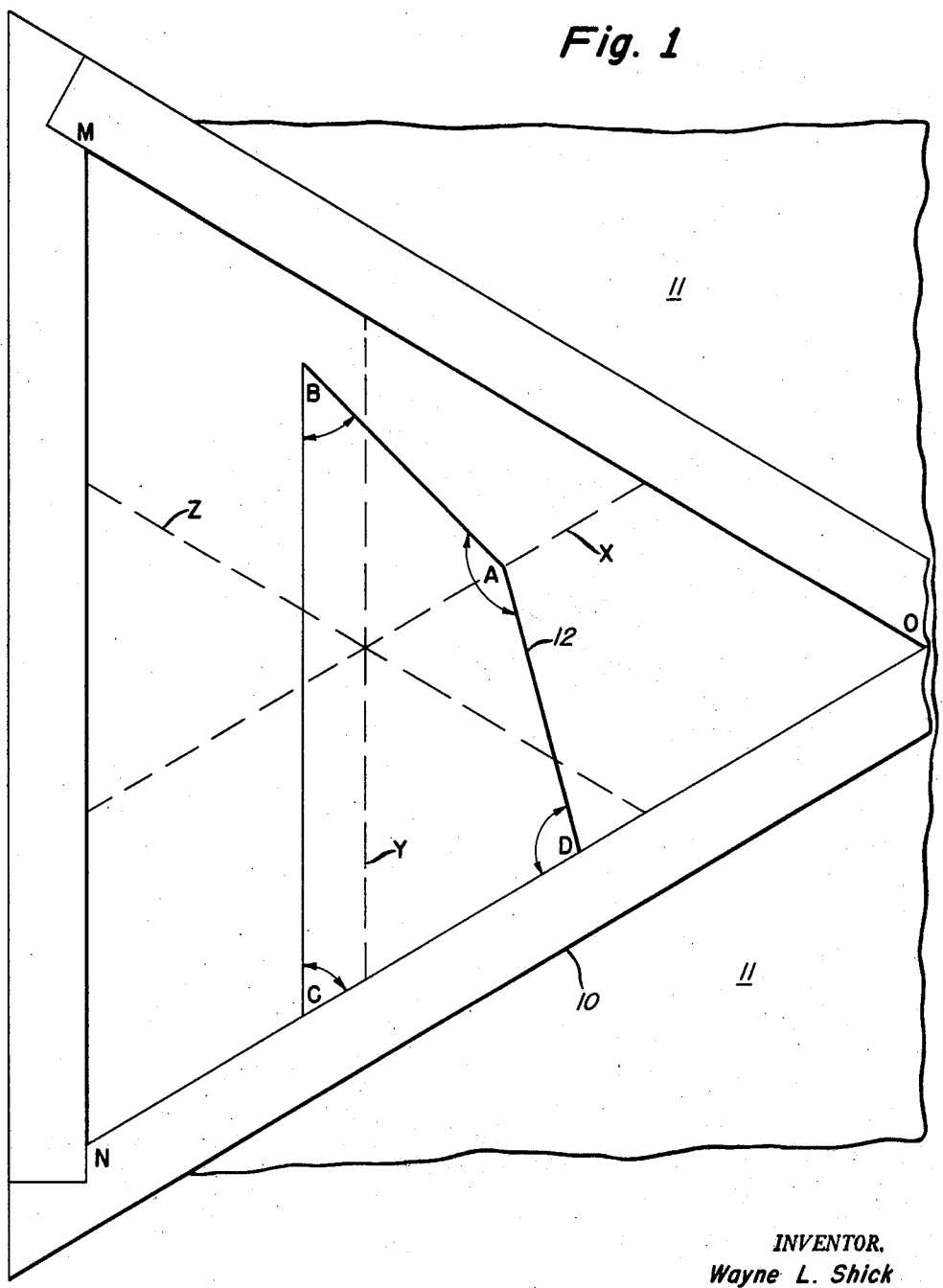

In the preferred embodiment illustrated in FIGURE 1, an equilateral triangular frame 10 manufactured in either a single piece or assembled from three interconnected legs to form equilateral triangle MNO is laid over a sheet of a suitable drawing paper 11 preferably with leg MN in a vertical position. With triangular frame 10 mounted on the drawing paper in this manner the isometric view which is produced will lay along a conventional reference plane at an angle generally employed to provide a realistic pictorial presentation. Quadrangle 12 employed in co-operation with frame 10 is fabricated from a thin sheet of a suitable material of construction such as plastic, aluminum, or other materials of construction normally used in the fabrication of drafting aids such as triangles and the like. The interior angles of quadrangle 12 are constructed such that:

Angle ABC equals 45°
Angle BCD equals 60°
Angle CDA equals 105°
Angle DAB equals 150°

For a given triangular frame MNO, the quadrangle ABCD manufactured to operate within the frame will have a side AD of such a length that when the riding edge CD of the quadrangle is moved respectively along the three legs, NO, MN and MO of the frame, the apex of angle BAD moves in a straight line locus, parallel to each respective leg along which the quadrangle moves, and located at a distance one-third of the altitude of the triangular frame 10. The sides AB and AD of the angle BAD form an orthographic projection edge.

In FIGURE 1, the various paths along which the apex of quadrangle ABCD moves during use are shown with the path taken by the quadrangle ABCD in shown position represented by broken line X and the path of the quadrangle ABCD in the other positions shown by broken lines Y and Z. When the quadrangle ABCD is in position X with riding edge CD in full contact with NO, projection lines between two orthographic views such as top and side view can be drawn along the edges AB and AD and the projection lines between an orthographic view and the isometric view such as top view and isometric view can be drawn along the edge BC. When the quadrange ABCD is in position with respect to path Y with riding edge CD in contact with leg MN, projection lines between two orthographic views such as a front and side view can be drawn along the orthographic projection edge formed by sides AD and AB and projection lines between an orthographic view and an isometric view such as side view and isometric view can be drawn along the edge BC. When the quadrangle ABCD is in position with respect to path Z with riding edge CD in full contact with leg MO, projection lines between another pair of orthographic views such as front and top view can be drawn along the orthographic projection edge formed by sides AD and AB and projection lines between an orthographic view and the isometric view such as front view and isometric view can be drawn along the edge BC.

Accordingly, in the three positions, X, Y, and Z the operation of quadrangle 12 within triangular frame 10 positions quadrangle 12 such that all of the projection lines can be drawn between any three orthographic views whose planes of projection are mutually perpendicular to each other and which planes are revolved into the plane of projection of the isometric view whose plane of projection makes equal angles with each of the three orthographic planes of projection and all of the projection lines can be drawn between each of the aforementioned orthographic views and the isometric view.

In a particular case, therefore, three orthographic views, viz, top, front, and side view, and the isometric view correlating the three orthographic views can be drawn with quadrangle 12 operating within frame 10. The reference planes upon which the orthographic views are based are formed by lines drawn using lines BA and AD as guides. For example, in FIGURE 4 with the riding edge CD of quadrangle 12 resting on leg MN the reference plane for a front view and side view is provided by the line B'A'D'. Another reference plane for the front view and top view is provided by means of line D'A"D" drawn with riding edge CD of quadrangle 12 resting on leg MO. The third reference plane is provided with riding edge CD of quadrangle 12 resting on leg NO to provide a third reference plane D"A'''B'. It will be noted that the reference lines join together to form a hexagon having a first set of alternate 150° interior angles and a second set of 90° alternate interior angles.

In the illustrative embodiment a rectangular prism is employed to illustrate the development of an isometric view 20 from three conventional orthographic views, viz, front view 21, top view 22, and side view 23. These various views are correlated each with the other by means of the orthographic projection edge BAD of the quadrangle. Thereafter in providing the isometric view, isometric projection edge BC is employed. In developing point B on the isometric view 20 corresponding to points B on orthographic views 21, 22 and 23 respectively, any two of the orthographic views can be employed. For example, in utilizing top view 22 and side view 23 to project point B the riding edge CD of quadrangle 12 is placed along leg NO of frame 10 and a construction line projected downwardly from point B of view 22. Point B of view 23 is projected upwardly therefrom with riding edge CD of quadrangle 12 resting on leg MN of frame 10. The intersection of these two construction lines will then determine point B of isometric view 20. If it is desired to check the relative position of this point or if it is desired to utilize three intersection construction lines to determine a particular point riding edge CD is positioned on leg MO with isometric projection edge BC passing through point B of front view 21. The construction line projecting upwardly from point B of view 21 will intersect with the construction lines projecting from points B of views 22 and 23. Thereafter as many additional points as may be required to complete the isometric view 20 are constructed using at least two of the views to establish a construction point.

By employing the device of this invention projections can be made without intermediate transfer lines with minimum error to provide an accurate direct projection between the various orthographic views and the isometric view. It should be noted in the event that other principal orthographic views, viz, view looking up, rear view, and left side view are used the correlated isometric view can be projected by turning over the paper and repositioning frame 10 thereon. To facilitate the drawing of these additional views a light-table and tracing paper can be employed.

The instant invention can also be adapted for use in connection with a conventional drafting machine employing a rotatable head in order to eliminate the use of a triangular guide frame for the quadrangle. In the embodiment illustrated in FIGURE 2, a modified quadrangle having the required orthographic projection edge in conjunction with an isometric edge is employed. The riding edge, not being required, is not included. A suitable coupling means for interconnecting the quadrangle and head is provided, such as a boss which engages with a slotted portion of the pivotable arm 31 forming a part of a conventional drafting head 32 of which a fragmentary view is shown. In order to provide a suitable means for guiding the direction of the quadrangle 30 to simulate the movement of the quadrangle riding edge along the leg of a triangular frame 10 there are employed short studs or guide pins 15, 16, and 17 positioned on the drafting board along imaginary miter lines between the orthographic views. Referring to FIGURE 4, these imaginary miter lines, shown by broken lines R, S, and T, would be the bisectors of the angle BAD provided by the three positions of the quadrangle on triangular frame 10. The quadrangle is provided with a transverse slot 33 which is coincident with the common bisector of interior angle BAD of the orthographic projection edge and the interior angle BCD of the isometric projection edge. This transverse slot will then ride on the short studs or guide pins 15, 16, and 17 positioned on the drawing board and will serve as the equivalent of the riding edge employed in the quadrangle illustrated in FIGURE 1. By employing a conventional drafting machine which has suitable detents at 15° intervals the quadrangle can be readily rotated about the drafting head and be automatically positioned in a position having the same relative arrangement as provided by the triangular frame shown in FIGURE 1.

Figure 3:
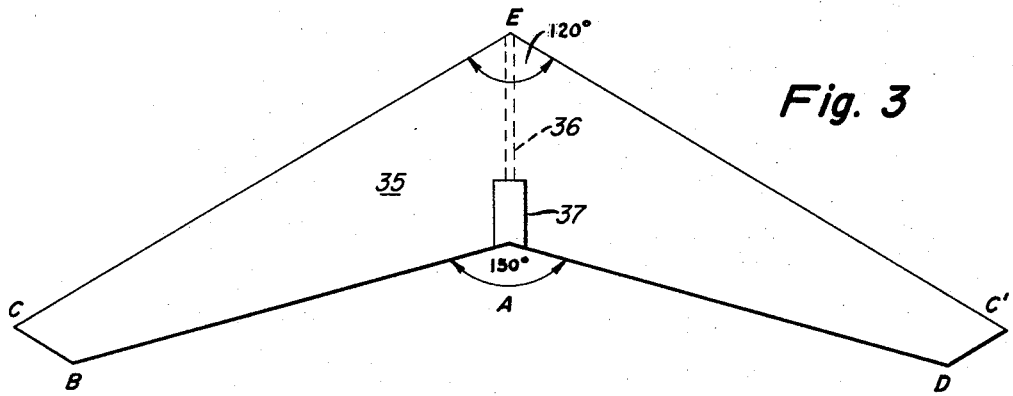
FIGURE 3 illustrates still another embodiment of a quadrangle component which can also be installed on the head of a conventional drafting machine.

Another embodiment of a quadrangle for installation on a drafting machine is shown in FIGURE 3. In this instance the orthographic projection leg BAD is employed in conjunction with an opposed isometric projection edge CEC'.

From these embodiments it will be noted that a slot 36 is provided as well as a coupling means 37 for fastening the quadrangle to the drafting head. In use this quadrangle is rotated to the appropriate position between an orthographic view and the isometric view or between two orthographic views. For example, in switching from the use of the orthographic projection edge in projecting between two orthographic views to the isometric projection edge for projecting between the same two orthographic views and the isometric view, the quadrangle is rotated through 180°.

Figure 2:
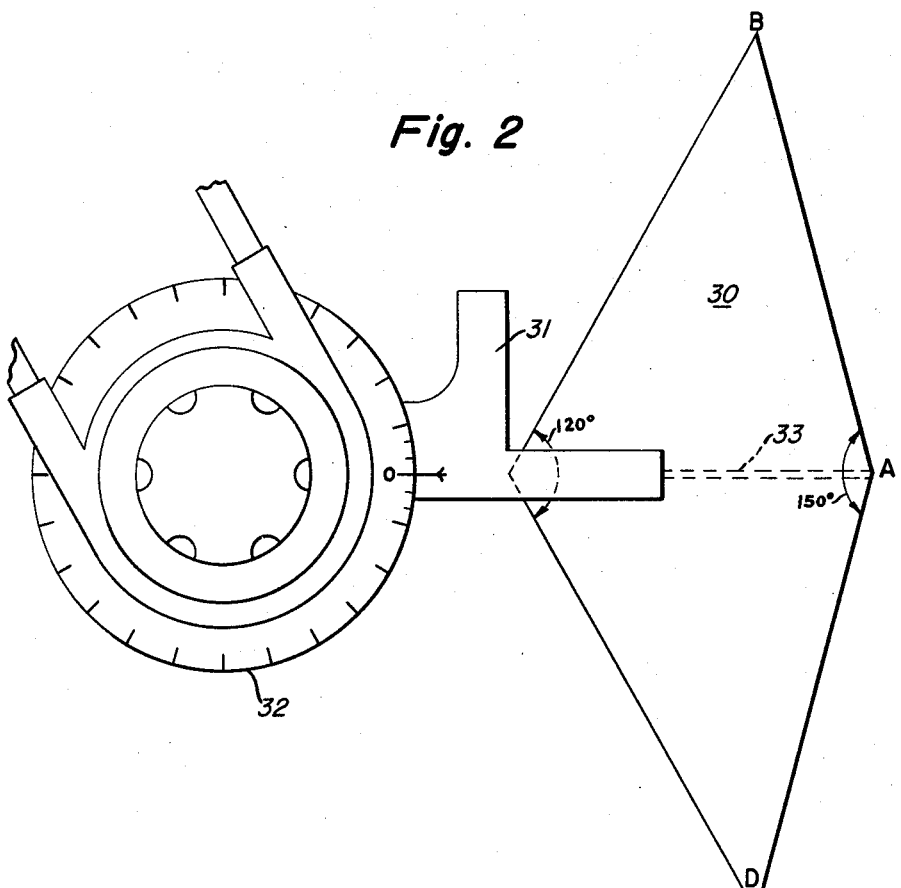
FIGURE 2 shows another embodiment of a quadrangle component which is utilized in conjunction with a conventional drafting machine and a modified drafting board.

In employing the quadrangles shown in FIGURES 2 and 3 a sheet of drawing paper of suitable size is punched at the location of the studs or pins and positioned thereon. By positioning the pins along the imaginary miter lines the paper is punched in areas wherein the orthographic or isometric views are not drawn.

Although primarily designed for the preparation of isometric projections by the utilization of a suitable number of orthographic views, it is apparent that the reverse procedure can be employed if desired and a suitable number of orthographic views projected from an isometric view which is provided initially. It may be desirable in fabricating the quadrangle to employ suitable linear scales on the face of the quadrangle or to punch out suitable templates such as ellipses for making isometric circular illustrations.

By employing the instant invention for the preparation of isometric drawings the preparation of the drawings can be done much faster and with greater facility and accuracy. With this drawing system, the illustrator is not required to visualize the object in three dimensions but can view the three dimenisonal picture of the isometric view in direct projection with the orthographic views all developing simultaneously. By means of the orthographic-isometric drawing device engineers, designers, and draftsmen can organize their ideas more readily. The three dimensional view in direct relationship to the detailed drawing will clarify communications between engineering and production people. Some illustration work can be supplanted by the isometric views easily developed at the design stage. The isometric view is a check view on the accuracy of the orthographic views. Ideas are sometimes suggested in a three dimensional pictorial presentation which are difficult to conceive in orthographic projections.

Although the foregoing invention has been described with relation to several specific embodiments, it is apparent that the foregoing discussion and description will suggest modifications and variations to those skilled in the art to which this invention pertains. These variations and modifications can be made without departing from the scope of the invention. It is therefore intended that the instant invention be limited only in the manner defined by the appended claims.

What is claimed is:

1. A device for the orthographic-isometric projection of an isometric view and of top, side and front orthographic views peripherally positioned within a hexagon having a first set of alternate interior angles of 150° with each of said views being positioned respectively at the apexes of a second set of alternate interior angles of 90° along reference lines formed by the sides of said hexagon adjacent said 90° interior angles which comprises an equilateral triangular frame comprising three interconnected legs constructed to circumscribe said hexagon, and a quadrangle sheet cooperating with said triangular frame and having an orthographic projection edge comprising an included angle of 150° and a pair of sides with the remaining interior angles being 105°, 60°, and 45°, respectively, said remaining angles being positioned clockwise from said 150° interior angle, the apex of said 150° interior angle lying on a locus parallel with a leg of said frame upon which the side of said quadrangle intermediate said 105° and 60° interior angles is abutting and at a distance one third of the altitude of said frame.

2. A device in accordance with claim 1 in which said triangular frame is an integral unitary one piece assembly.

3. A device in accordance with claim 1 in which said triangular frame is assembled from at least three straight-sided legs.

4. A device in accordance with claim 3 in which said legs are coupled adjacent their terminal ends.

References Cited in the file of this patent

UNITED STATES PATENTS

| | | |
|---|---|---|
| 777,407 | Early | Dec. 13, 1904 |
| 1,600,666 | Dugan | Sept. 21, 1926 |
| 1,723,517 | McFadden | Aug. 6, 1929 |
| 1,755,024 | Sanden | Apr. 15, 1930 |

FOREIGN PATENTS

| | | |
|---|---|---|
| 344,254 | Germany | Nov. 17, 1921 |
| 328,689 | Great Britain | May 5, 1930 |
| 816,505 | Germany | Oct. 11, 1951 |
| 895,531 | Germany | Nov. 2, 1953 |

OTHER REFERENCES

Publication: "Isometrical Drawing" by T. Sopwith, published in London, John Weale, 59, High Holborn, 1838.

Publication: "Der Civilingenieur" (1857), article entitled "Elementare Begrundung der Axonometric," by A. Junge.

Publication: A New Method of Axonometric Projection, by R. P. Hoelscher, Journal of Engineering Education, vol. 34, November 1943, pages 233–244.